Patented Apr. 13, 1926.

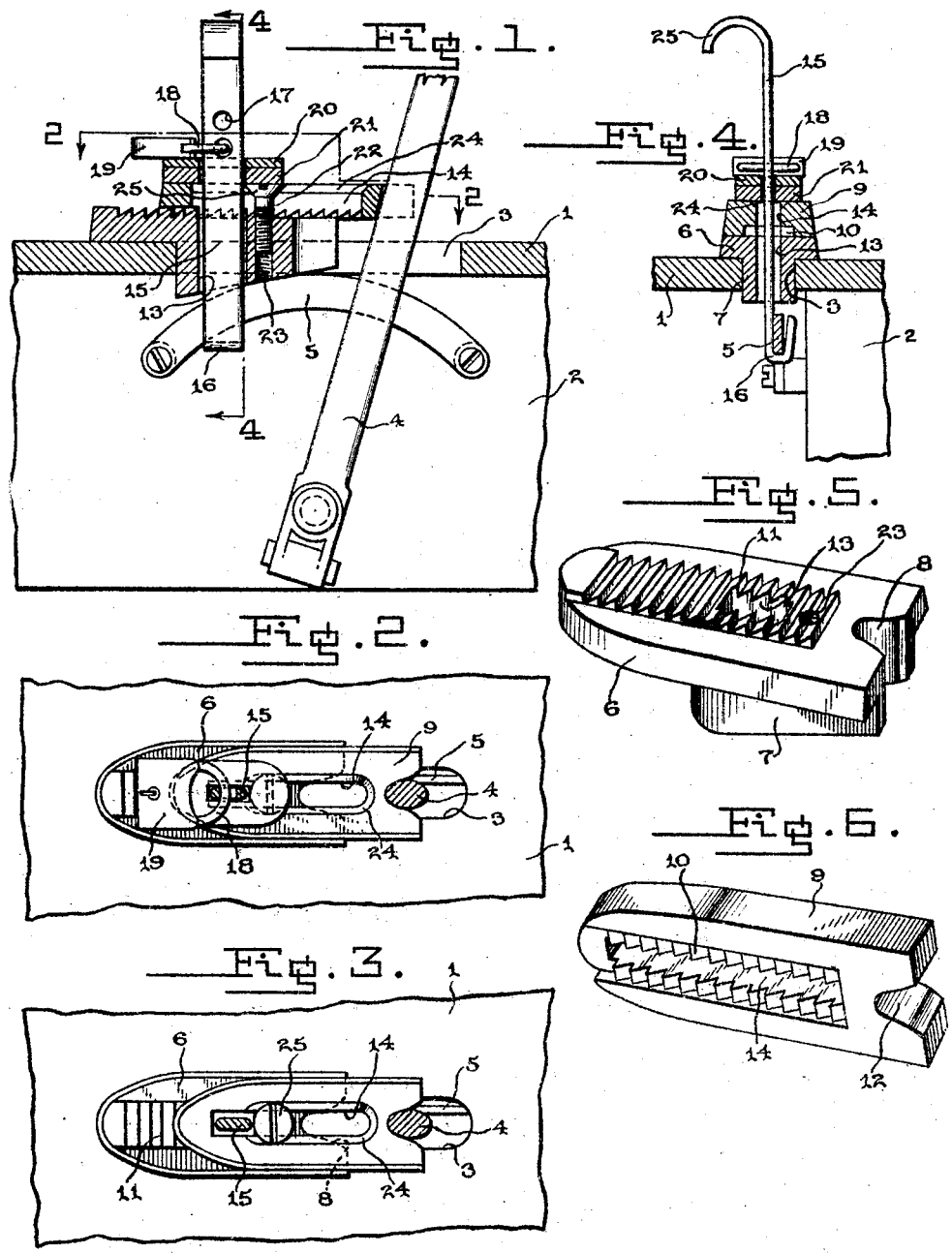

1,581,035

UNITED STATES PATENT OFFICE.

THOMAS J. STEPHENSON, OF MONTROSE, CALIFORNIA.

AUTOMOBILE LOCK.

Application filed July 21, 1925. Serial No. 45,030.

*To all whom it may concern:*

Be it known that I, THOMAS J. STEPHENSON, a citizen of the United States, and a resident of Montrose, in the county of Los Angeles and State of California, have invented certain new and useful Improvements in Automobile Locks, of which the following is a specification.

My invention relates to improvements in automobile locks of the type of construction which comprises a locking member for holding an operating lever of a motor vehicle or like mechanism against movement from a desirable position, as for example, a locking member for holding the emergency brake lever of an automobile against movement in the usual slot in the floor board of the automobile from position to hold the brakes applied.

The present invention may be termed a species which belongs to the same class as the invention which is disclosed in my prior application for Letters Patent of the United States for improvement in brake locks, filed April 5, 1923, Serial #634,625, and the present invention consists in the combinations, constructions and arrangements herein described and claimed.

An object of the present invention is the provision of an automobile lock of the character described which affords facilities for releasably holding an operating lever of a motor vehicle against movement from a given position and which is adjustable for any purpose, as to compensate for wear, to hold the operating lever against movement from any one of a plurality of positions, or to adapt the device for use with the operating lever of any one of a plurality of motor vehicles or like mechanisms of different constructions but all of that type having the operating lever swingable in a slot in a floor board or like part.

Other objects and advantages of the invention will be apparent from the following description, considered in conjunction with the accompanying drawings, in which:

Figure 1 is a fragmentary vertical section through a portion of a floor board and through the improved lock shown in position in a slot in the floor board to hold an operating lever against swinging in one direction in said slot, Figure 2 is a section substantially along the line 2—2 of Figure 1, Figure 3 is a view similar to Figure 2, with elements of the locking device omitted to disclose parts which would otherwise be hidden, Figure 4 is a section along the line 4—4 of Figure 1, Figure 5 is a perspective view of the base section of the locking block of the device, and Figure 6 is a perspective view of the upper section of the locking block.

In Figures 1 to 4 inclusive, I show at 1 a portion of a floor board which may be a part of a motor vehicle, and which may be supported on frame members such as indicated at 2 in Figures 1 and 4. The floor board is formed with a vertical slot at 3 through which a lever 4 extends, and along which the lever 4 is adapted to swing. In the present instance, the lever 4 may be the emergency brake lever of the motor vehicle.

A quadrant or other arcuately curved bar 5 is secured underneath the floor board substantially in the plane of the slot 3 with the convexly curved wall of the bar 5 turned upward for a purpose to be presently described.

The invention provides a locking block adapted to be partially received in the slot 3 between the lever 4 and one end of the slot for holding the lever from swinging toward said one end of the slot. This locking block comprises a base section 6 formed with a reduced portion 7 which extends from one end of the base section for part of the length of the latter, and is adapted to fit in the slot 3 between the inner end of the slot and the lever 4, and so that the body of the base section 6 overlaps the floor board forwardly of the slot 3 as clearly shown in Figure 1. The base section is formed with a vertical notch 8 in its forward end for engaging with the lever 4, this notch 8 extending from the upper face of the base section 6 to the lower face of the reduced portion 7 of the base section 6.

The locking block also includes an upper section 9 which is adapted to be superimposed on the base section 6 and is formed with a longitudinally extending series of teeth 10 on its lower face for engaging with cooperating teeth 11 on the upper face of the base section 6. Each tooth 11 on the base section 6 has a substantially vertical wall at its rearward end and has the other wall thereof inclined downwardly and forwardly while each tooth 10 on the lower face of the upper section 9 has the rear wall thereof substantially vertical and the other wall thereof inclined upwardly and rearwardly, whereby sliding movement of the upper section 9 on the base section 6 in a forward direction will be prevented when the upper section 9 rests flatwise on the base section although sliding movement of the upper section 9 on the base section in a rearward direction can be conveniently and easily effected.

The upper section 9 is formed with a vertical notch 12 in its forward end similar to the notch 8 and also for engaging with the lever 4. The base section is formed with a vertical opening 13 extending through the toothed portion thereof and also through the reduced lower end portion 7 of the base section, and the upper section 9 is formed with a longitudinally extending vertical slot 14 which extends through the toothed portion of the upper section and with which the opening 13 is alined. A holding bar 15 has a shank extending through the opening 13, and the slot 14 and has a hook 16 at its lower end for engaging with the lower edge portion of the arcuately curved bar 5. The shank of the holding bar 15 is formed with a longitudinally extending series of transverse openings 17. The shackle 18 of a padlock 19 may be inserted through any one of the openings 17, and may cooperate with spacing washers such as indicated at 20 and 21, respectively, to hold the holding bar 15 against downward movement from the position shown in Figure 1, and therefore the locking block 6—9 will be held against displacement from position to extend into the slot 3 in the floor board between the lever 4 and the forward end of the slot 3.

The upper section 9 of the locking block is positively prevented from moving upward from adjusted position on the base section 6 by means of a clamping screw 22 having a shank extending through the slot 14 and in threaded engagement with a vertical opening 23 in the base section 6 forwardly of the opening 13, the upper end portion of the slot 14 being widened or enlarged laterally at 24 to engage with opposite edge portions of the head 25 of the clamping screw and to permit the clamping screw to be screwed to such position that the upper face of the head of the clamping screw will be substantially flush with the upper face of the upper section 9 of the clamping block, and the upper section 9 of the clamping block will be clamped between the head of the screw and the lower or base section 6 of the block in adjusted position on the base section of the locking block.

The upper end portion of the holding bar 15 may be curved to extend laterally as indicated at 25 so that the holding bar cannot fall accidentally completely through the slot 14 and the opening 13 in the locking block should the holding bar be released after the shackle of the padlock 19 has been detached therefrom.

From the foregoing description of the various parts of the device, the operation thereof may be readily understood. The lever 4 may be assumed to be in position to hold the brakes of the motor vehicle applied when the lever extends through the rearward portion of the slot 3 as shown in Figure 1. The screw 22 then is loosened sufficiently to permit the upper section 9 of the locking block to be moved on the base section of the locking block until the slot or notch 12 in the rearward end of the upper section 9 of the locking block is in engagement with the lever 4. The screw 22 then is tightened and the sections of the locking block will comprise a substantially rigid unit which will positively prevent the lever 4 from swinging forward along the slot 3 from position to hold the brakes of the motor vehicle applied.

Movement of the upper section 9 of the locking block from adjusted position on the base section of the locking block is prevented, not only by the clamping screw 22, but by the washers 20—21 and the padlock 19 which also functions to hold the block as a unit against upward displacement from position to engage with the slot 3. The locking block therefore is adjustable as to length to compensate for wear or to adapt the device for use to hold a lever against swinging in one direction from any one of a plurality of positions along the slot with which the locking block of the device is associated or to adapt the device for use with any one of a plurality of motor vehicles having slots of different lengths similar to the slot 3.

Obviously, the invention is susceptible of embodiment in forms other than that which is illustrated in the accompanying drawings, and I therefore consider as my own all such modifications and adaptations thereof as fairly fall within the scope of the appended claims.

I claim:—

1. A locking device for a mechanism having a lever swingable along a slot in a stationary member, said locking device comprising a base section having a reduced lower end portion fitting in said slot in the stationary member between an end of said slot and said lever, an upper section adapted to be superimposed on said base section, said upper section and said base section having cooperative teeth on the adjacent faces thereof for holding said upper section against sliding on the base section in the direction opposite said lever, said base section having a vertical opening in the portion thereof which is in line with said slot in the stationary member, and said upper section of the block having a longitudinal slot with which said vertical opening in the base section is in alinement, and a clamping screw extending through said slot in the upper section into said base section, said screw being adjustable to clamp the upper section tightly to the base section or to permit the upper section to be slid on the base section toward said lever, as desired.

2. A locking device for a mechanism having a lever swingable along a slot in a stationary member, said locking device comprising a base section having a reduced lower end portion fitting in said slot in the stationary member between an end of said slot and said lever, an upper section adapted to be superimposed on said base section, said upper section and said base section having cooperative teeth on the adjacent faces thereof for holding said upper section against sliding on the base section in the direction opposite said lever, said base section having a vertical opening in the portion thereof which is in line with said slot in the stationary member, and said upper section of the block having a longitudinal slot with which said vertical opening in the base section is in alinement, said slot in the upper section of the block having the upper end portion thereof enlarged laterally, a clamping screw having a shank extending through said slot in the upper section, and in threaded engagement with the vertical opening in the base section, the edges of the head of said screw engaging with the laterally enlarged upper end portion of said slot in the upper section for holding said upper section releasably against upward displacement from adjusted position on said base section.

3. A locking device for a mechanism having a lever swingable along a slot in a stationary member, said locking device comprising a base section having a reduced lower end portion fitting in said slot in the stationary member between an end of said slot and said lever, an upper section adapted to be superimposed on said base section, said upper section and said base section having cooperative teeth on the adjacent faces thereof for holding said upper section against sliding on the base section in the direction opposite said lever, said base section having a vertical opening in the portion thereof which is in line with said slot in the stationary member, and said upper section of the block having a longitudinal slot with which said vertical opening in the base section is in alinement, and means extending through said slot in the upper section and engaging with said base section for releasably holding said upper section against upward displacement from superimposed position on said base section, a bar supported beneath said slot in said stationary member, a holding bar extending through the slot in the upper section of the block and through the vertical opening in the base section of the block and having a hook portion for engaging said bar, said holding bar having transverse openings in the portion thereof which extends above said upper section of the block, and a padlock having a shackle extending through one of said openings in the shank of the holding bar for preventing accidental movement of said holding bar with respect to said stationary member.

THOMAS J. STEPHENSON.